Figure 1:
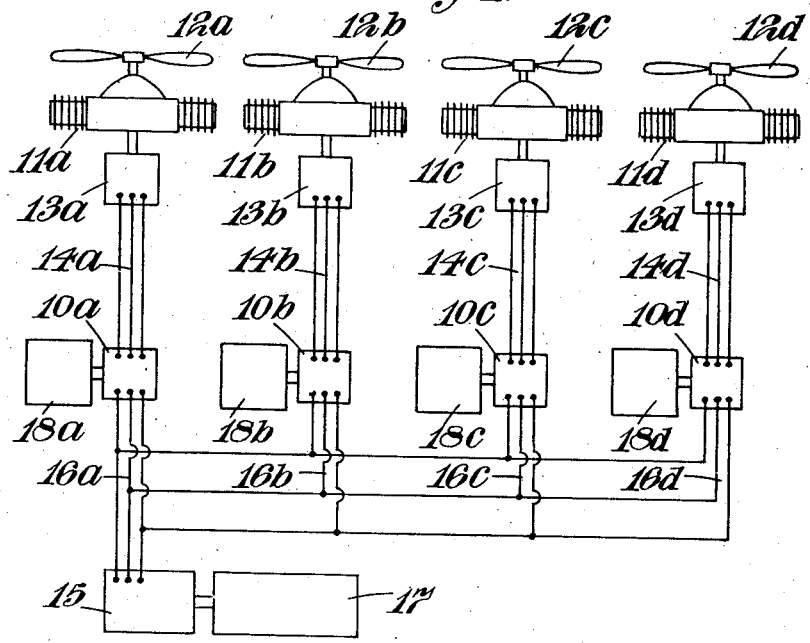

Oct. 1, 1946.  P. R. PRICE  2,408,683
SPEED CONTROL AND SYNCHRONIZING DEVICE
Filed July 8, 1943  3 Sheets-Sheet 1

Inventor
Peter R. Price
by Wilkinson & Mawhinney
Attorneys

Oct. 1, 1946.                P. R. PRICE                    2,408,683
             SPEED CONTROL AND SYNCHRONIZING DEVICE
                Filed July 8, 1943           3 Sheets-Sheet 3

Inventor
Peter R. Price
by Wilkinson & Mawhinney
Attorneys

Patented Oct. 1, 1946

2,408,683

UNITED STATES PATENT OFFICE 2,408,683

SPEED-CONTROL AND SYNCHRONIZING DEVICE

Peter Ralph Price, Bristol, England, assignor, by mesne assignments, to Rotol Limited, Gloucester, England Application July 8, 1943, Serial No. 493,921
In Great Britain February 19, 1942

6 Claims. (Cl. 170—135.6)

This application corresponds to the application of The Bristol Aeroplane Company Limited and Peter Ralph Price, Serial No. 2240/42, which was filed in Great Britain on February 19, 1942.

This invention concerns speed-control and/or synchronizing devices for engines, such as may be used for example to control the speed and/or synchronize the engines (and hence the airscrews) of a multi-engined aircraft.

In connection with a multi-engined aircraft it has heretofore been proposed to provide for each engine an electric differential unit which receives current from a pair of alternators, one being driven by the engine and the other by suitable means at a datum speed. The differential unit is responsive to frequency-differences which occur when the engine-driven alternator operates at a different speed from the datum-speed alternator, that is when the engine-speed departs from the value selected for it by the datum. When a frequency-difference occurs the differential unit is brought into operation to adjust an engine-driven fly-weight governor. This is of the type in which the "on-speed" position of the governor fly-weights and hence the speed of the governor and the engine is adjusted by varying the tension or compression of a spring which co-acts with the fly-weights. In the prior proposal the spring-adjustment was effected in one direction or another by said differential unit to return the engine-speed to its datum value, so that the deflection-compression characteristics of the spring have an effect upon the operation of the control.

According to the present invention a speed-control device for an engine is characterized in that a speed responsive device which controls the engine speed is driven at a speed which is the difference between the engine speed and the speed of a reference unit.

According to another feature of the present invention a speed-control device for an engine is characterized in that a normally constant speed difference is maintained between two members of a differential unit by an engine whose speed is to be controlled and a reference speed unit and in that the differential unit drives, in one direction only, a speed responsive device which controls the engine speed in accordance with the prevailing value of speed difference.

In the case of an aircraft the speed-varying device, may operate by adjusting the pitch of the blades of a variable pitch propeller.

According to yet another feature of the present invention a speed-control device for an engine comprises a reference speed unit, a differential unit between two members of which a normally constant speed difference is maintained by said reference speed unit and the engine whose speed is to be controlled, and a speed responsive device which is driven by said differential unit and controls the engine speed in accordance with the prevailing value of speed difference.

It is preferred to provide an electrical differential unit which is connected to an alternator the frequency of which is related to the speed of the reference speed unit and to an alternator the frequency of which is related to the speed of the engine which is to be controlled, said differential unit being responsive to a frequency difference which is maintained between the alternators and driving a governor for controlling the speed of the engine at a speed dependent on said frequency differences.

Alternatively the electric differential unit is connected to an alternator the frequency of which is related to the speed of the engine which is to be controlled, and also driven by the reference speed unit, said differential unit driving a governor for controlling the engine speed at a speed dependent on the speed of the reference unit and the frequency of the current transmitted by the alternator.

In one form of the invention as applied to the control of a plurality of engines, the device is effective not only in controlling the speed of the engines but also in maintaining the speeds of all the engines in synchronism.

Figure 2:
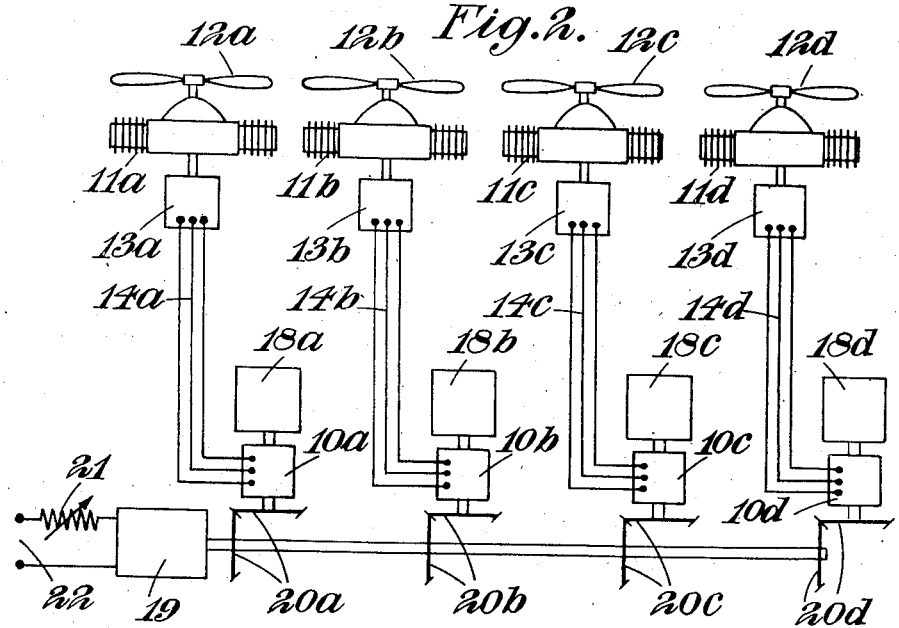
Figure 3:
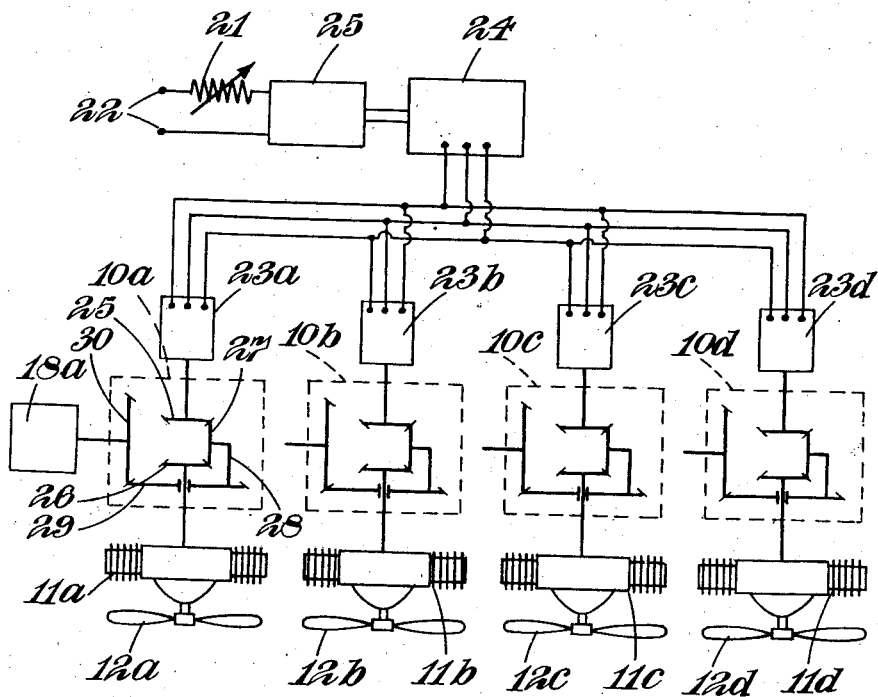
Figure 4:
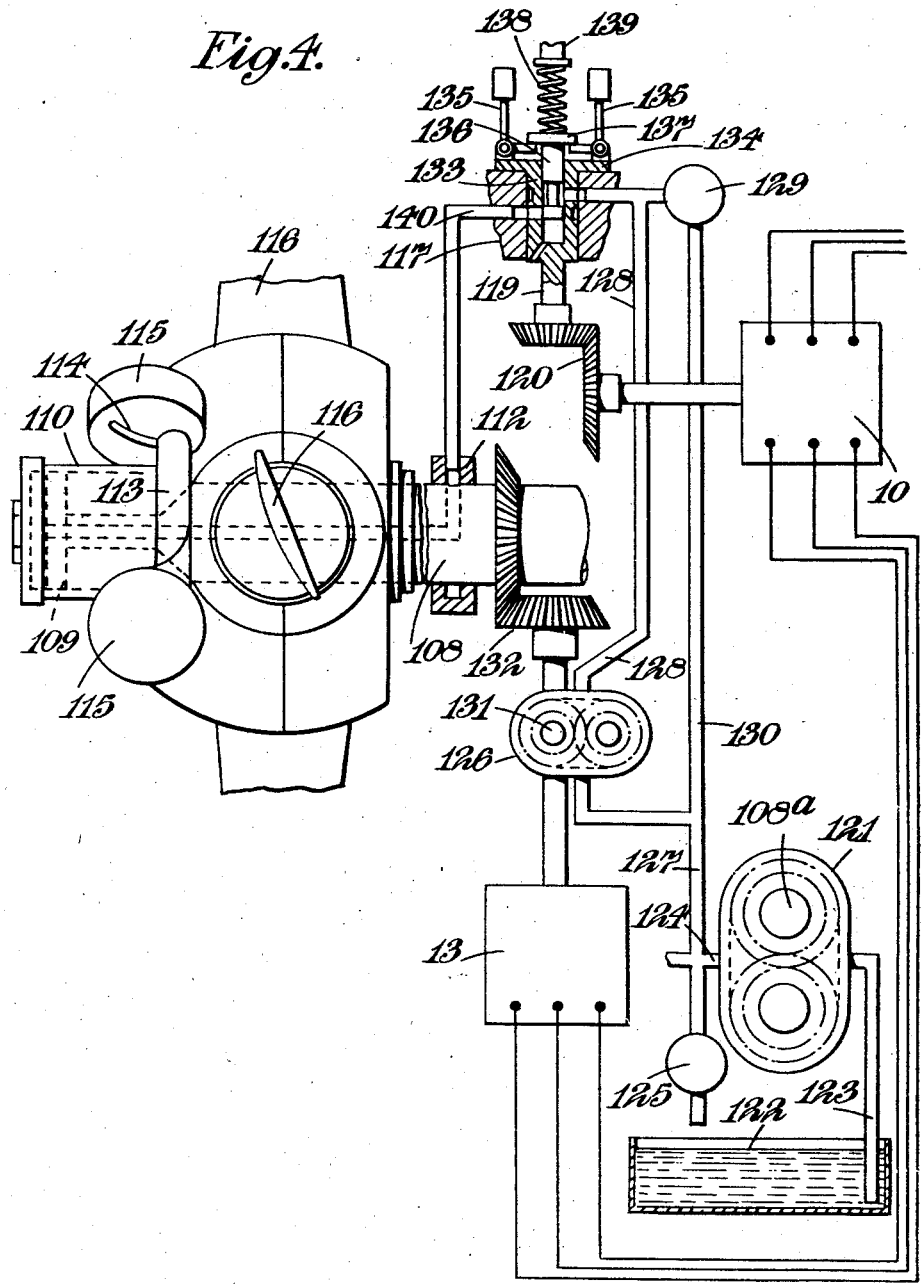

Specific embodiments of the invention will now be described by way of example with reference to the accompanying drawings of which:

Figures 1, 2 and 3 diagrammatically show three forms of construction of engine speed control as applied to a multi-engined aircraft, the control in each case being also capable of maintaining the engines in synchronism. Figure 4 is a diagrammatic representation of a variable pitch propeller incorporating a speed control and synchonizing device in accordance with the present invention.

Referring to Figure 4, 108 is an engine crank shaft on the forward end of which a piston 109 is mounted, received in a cylinder 110 which is arranged to reciprocate relative to the piston. Forward movement of the cylinder 110 is obtained by supplying oil under pressure through a passage provided in the crank shaft, the passage extending from a collector ring 112 forward through the piston 109 as shown. The cylinder has arms 113 which engage with cam slots 114 on the counterweights 115 attached to the blades 116 in well known manner whereby to turn the blades to a position of less pitch in the forward movement of the cylinder each of the counterweights being moved inwardly towards the crank shaft axis. When oil is allowed to escape from the cylinder 110 through the passage in the crank shaft so that the cylinder is free to move rearwardly, the counterweights 115 move outwardly away from the crank shaft axis under centrifugal force and cause the blades 116 to move to a higher pitch position.

The passage of pressure oil to and from the cylinder 110 is regulated by a valve generally indicated by the reference numeral 117, the valve adjustments being performed by a fly-weight governor whereby upon an increase or decrease of the engine speed the valve 117 is automatically adjusted to produce corresponding changes in propeller pitch so as to maintain the engine speed at a predetermined datum value or so as to change the engine speed to a new datum value. The fly-weight governor is driven by shaft 119 from a differential speed unit 10 (as will be hereinafter described) through the agency of gear 120.

A gear pump 121 is provided the driving shaft 108ᵃ of which is an extension of the crank shaft 108 so that the pump is continuously driven during the operation of the engine. This pump is the engine lubricating pump and draws oil from sump 122 through pipe 123 and delivers it through pipe 124 to the engine a constant delivery pressure being assured by the pressure relief valve 125. A second gear pump 126 is provided the driving shaft 131 of which is driven from the crank shaft 108 through gear 132. The pump 126 is supplied with oil by a pipe 127 from the pump 121 and delivers it at a higher pressure through a passage 128 to the governor valve 117. A constant pressure is maintained on the delivery side of the pump 126 by a pressure relief valve 129 which is arranged to discharge by pipe 130 to the suction side of the pump.

An alternator 13 is also driven from the engine crank shaft 108 through the gears 132. The function of the alternator will be described hereinafter.

The shaft 119 is integrally formed with a member 133 having a flanged portion 134 which pivotally supports the fly-weights 135 of the fly-weight governor. The fly-weights of the governor are provided with fingers to engage a collar 137 of the valve stem 136 said collar being also engaged by a compression spring 138 the upper end of which abuts against a stop 139. With this arrangement when the speed of the fly-weight governor increases, the fly-weights 135 move outwardly due to the increased centrifugal force to which they are subjected and thereby raise the valve stem 136 against the pressure of the spring 138. Oil is thereby permitted to escape from the cylinder 110 by way of the collector 112 and pipe 140 through the governor valve 117 and the propeller blades 116 are set to a coarser pitch to reduce the engine speed. When the speed of the fly-weight governor falls, the fly-weights 135 move inwardly due to the reduction in the centrifugal force to which they are subjected and the spring 138 moves valve stem 136 downwardly into member 133. As a consequence pressure oil is permitted to pass from pipe 128 through the governor valve 117 to pipe 140 and thence to the cylinder 110. The propeller blades will therefore be moved to a finer pitch setting and the engine speed will increase.

It will be apparent from what has been said that the engine speed is dependent upon the speed of the fly-weight governor whose speed in turn is dependent upon the speed of the differential unit 10 which drives it. The method of controlling and varying the speed of the differential unit 10 will now be described with reference to Figures 1, 2 and 3 of the accompanying drawings.

In the construction shown in Figure 1 each differential unit referred to above is of known type and comprises a pair of windings one of which is carried by a stator and the other by a rotor, the arrangement being that when each winding is connected to an alternator, the frequency of the two sources being different the rotor rotates at a speed dependent on the frequency difference.

The differential units which are generally indicated at 10a—d are respectively associated with an engine 11a—d: the latter respectively drive a hydraulic variable pitch propeller 12a—d and an alternator 13a—d.

Each of the alternators 13 is connected to the stator winding of each of the differential units 10 by leads 14 whilst the rotor winding of each unit 10 is connected to an alternator 15 by leads 16. This alternator is driven at a reference speed by a donkey engine 17 housed within the aircraft fuselage, the engine 17 being provided to operate the ancillary units of the aircraft and of the engines 11.

Alternators 13 and 15 have similar frequency characteristics and are adapted to be driven at different speeds by their respective engines. In this way a frequency difference is produced between the alternators and this when applied to each unit 10 will cause rotation of the rotor thereof.

Associated with each differential unit 10 is a constant-speed mechanism 18 which is adapted to regulate the passage of oil under pressure to and from the hydraulically actuated variable pitch propeller 12 of its respective engine 11. The mechanism 18 is of known type and automatically controls the blade-pitch of the propellers by said pressure oil so as to keep the engine-speed constant. The constant-speed mechanism incorporates a fly-weight governor and this is driven by the rotor of its associated differential unit.

With this arrangement each governor is always in the "on-speed" position for a preselected value of a governor-speed so that the engines will be maintained in synchronism at a constant speed whilst alternator 15 and each of alternators 13 are producing a frequency difference sufficient to enable the rotor of each differential unit 11 to drive its governor at said preselected value.

Under these conditions if for example the speed of engine 11c varies from the constant speed selected (say it increases) alternators 13c will transmit a corresponding frequency increase to the stator winding of the differential unit 10c. The change in frequency difference thus produced will make the rotor rotate at a speed higher than the pre-selected value required to maintain the "on-speed" position. The constant-speed mechanism 18c is thus operated in the required sense to coarsen the blade-pitch of propeller 12c and thus reduce the engine-speed so that it is returned to the constant speed selected. This accomplished, the frequency difference applied to differential unit 10c reverts to that required to maintain the governor in the "on-speed" condition.

Similarly if the speed of any one or more of engines 11a—d departs from the selected value (it is immaterial whether this be an increase or a decrease) the differential unit associated with the engine affected is brought into operation to re-set the propeller blades as is necessary to bring the engine speed back to the selected value.

Since alternator 15 is common to all the engines 11a—d it follows that the speed of all four engines will be maintained at the same selected value provided the alternators 13a—d have similar frequency characteristics.

If it is desired to change the speed of all four engines from an existing value thereof to some other value, the speed of the alternator 15 is altered so as to produce a change in the frequency difference existing between it and each of alternators 13a—d. The differential units 10a—d are thus simultaneously adjusted to produce an "off-speed" condition in each governor which will effect the desired change in engine speed. When this has been accomplished the governors are again driven at the preselected value which maintains them in the "on-speed" condition. Changes in speed of the engines from the value selected and now prevailing will have the effect described above—the engine which departs from this newly selected speed value being returned thereto.

Instead of the alternators 13 and 15 having similar frequency characteristics and being driven at different speeds, they may have different frequency characteristics and be driven at the same speed so long as a frequency difference be produced to move the rotors of the differential units.

In the alternative construction shown in Figure 2 the differential units 10 are each constructed so that the rotor and "stator" are both capable of rotation. As in the construction shown in Figure 1 the "stator" of the units 10 are connected by leads 14 to alternator 13 which is driven (along with the hydraulic variable pitch propeller 12) by engine 11. This "stator" is driven by an electric motor 19 through bevel-gears 20, the speed of motor 19 being varied by adjustment of the variable resistance 21: a source of electric supply is indicated generally at 22.

The rotor of the differential units drives the governor of the constant-speed mechanisms 18, the speed of rotation of said rotor (and hence of said governor) being dependent upon two factors, one the frequency of the current generated by alternators 13 the other the speed of the motor 19. These factors are selected so that the speed condition referred to above is satisfied.

It will be appreciated that as in the construction described with reference to Figure 1, changes in the frequency of one or more of generators 13 when engines 11 increase or decrease their speed are rectified by the differential units adjusting the constant speed mechanisms. Moreover if it is desired to change the speed of all four engines from an existing to a new value, it is only necessary to adjust the resistance 21 to impart the required speed change to motor 19.

In Figure 3 the differential units 10 are each comprised by mechanical gearing. One member is driven by engine 11, and the other by a synchronous motor 23. The latter is supplied with current by an alternator 24 which is driven by a variable speed electric motor 25. The latter receives current from source 22 and the speed is varied by varying resistance 21. It will be appreciated from Figure 3 that one such synchronous motor and differential unit is associated with each engine 11 and that alternator 24 is common to the four motors 23. It follows therefore that the four motors rotate at the same speed and that this is dependent on the speed of alternator 24.

The differential units are each constructed as follows: a bevel-gear 25 is driven by synchronous motor 23, another bevel-gear 26 is located facing gear 25 and is driven by engine 11. Meshing with gear 25, 26 is a planet gear 27 which whilst a speed difference is maintained between the engine and motor driven gears 25, 26 rotates about its own axis and also describes a path around the common axis of said gears. Planet gear 27 is connected (as at 28) with a bevel-gear 29 disposed co-axial with gears 25, 26. It thus follows that the rotation of planet gear 27 around the common axis of gears 25, 26 is transmitted to gear 29 and thence by gear 30 to the constant speed mechanism 18.

A speed difference is maintained between engine 11 and synchronous motor 23, and this is translated by the differential unit 10 into a drive for the constant-speed mechanism. The speed difference is selected to maintain the governor in the "on-speed" position.

The operation is similar to that described with reference to Figures 2 and 3.

In electrically and hydraulically operated propellers it is customary for the governor to adjust a hydraulic-servo-unit which controls the electric or hydraulic circuit to the airscrews. The speed of the governor in the "on-speed" condition may be affected by the viscosity of the oil which circulates in the servo-unit so that where otherwise convenient it is preferable to group together all the governors of the control devices described above and to provide an oil supply common to the governors. Then in so far as the speed of the governors is affected by viscosity changes, they are all affected to the same extent and once the governors have been set for the same speed in the "on-speed" condition they will maintain the same speed.

The speed of all the governors in the "on-speed" condition may be synchronized initially by adjustment of the governor springs, and subsequent variations in the speed of any one or more of the governors from the initially selected value corrected in the same way.

The control device described in each of the above embodiments may be so designed (or may incorporate means) so that a failure of a part of the device will lock the blades of the airscrew of the affected engine (or engines) preferably at a predetermined pitch. Thus in the embodiment shown in Figure 3 a failure of a synchronous motor 23, or of its supply may bring into operation an electro-magnetic brake associated with the affected motor. Actuation of said brake is effective to produce a suitable pitch setting of the airscrew blades.

I claim:

1. A speed control and synchronizing device for a plurality of engines comprising a reference speed unit common to all said engines, a differential unit which is associated with each engine and between two members of which a normally constant speed difference is maintained by said reference speed unit and the associated engine, one member of said differential unit driven by its associated engine and the other member driven by said reference speed unit so that normal constant speed difference is maintained between the members, a flyweight governor driven by each differential unit, propellers driven by said engines, a pitch change motor for each propeller and connected to the respective flyweight governors whereby said governor controls its associated pitch change motor to maintain the associate engine in synchronism with the other engines, and means for adjusting datum speed of reference speed unit whereby speed of all engines is simultaneously varied and speeds are maintained in synchronism during variation.

2. A speed control and synchronizing device for a plurality of engines comprising a reference speed unit common to all said engines, an alternator associated with and driven by each engine, an alternator driven by the reference speed unit, an electric differential unit for each engine, said differential unit being connected to its associated engine driven alternator and the common reference speed alternator, one member of said differential unit driven by its associated engine and the other member driven by said reference speed unit so that normal constant speed difference is maintained between the members, a flyweight governor driven by each differential unit, propellers driven by said engines, a pitch change motor for each propeller and connected to the respective flyweight governors whereby said governor controls its associated pitch change motor to maintain the associate engine in synchronism with the other engines, and means for adjusting datum speed of reference speed unit whereby speed of all engines is simultaneously varied and speeds are maintained in synchronism during variation.

3. A speed control and synchronizing device for a plurality of engines comprising a reference speed unit common to all said engines, an alternator driven by the reference speed unit, an electric differential unit which is associated with and driven by each engine and which is connected to the common reference speed alternator, one member of said differential unit driven by its associated engine and the other member driven by said reference speed unit so that normal constant speed difference is maintained between the members, a flyweight governor driven by each differential unit, propellers driven by said engines, a pitch change motor for each propeller and connected to the respective flyweight governors whereby said governor controls its associated pitch change motor to maintain the associate engine in synchronism with the other engines, and means for adjusting datum speed of reference speed unit whereby speed of all engines is simultaneously varied and speeds are maintained in synchronism during variation.

4. A speed control and synchronizing device for a plurality of engines comprising a reference speed unit common to all said engines, an alternator associated with and driven by each engine, an electric differential unit which is associated with and connected to each alternator and each of which is driven by the reference speed unit, one member of said differential unit driven by its associated engine and the other member driven by said reference speed unit so that normal constant speed difference is maintained between the members, a flyweight governor driven by each differential unit, propellers driven by said engines, a pitch change motor for each propeller and connected to the respective flyweight governors whereby said governor controls its associated pitch change motor to maintain the associate engine in synchronism with the other engines, and means for adjusting datum speed of reference speed unit whereby speed of all engines is simultaneously varied and speeds are maintained in synchronism during variation.

5. A speed control and synchronizing device for a plurality of engines comprising a reference speed unit common to all said engines, a mechanical differential unit associated with each engine each of said units having one gear wheel driven by the engine, another gear wheel driven by the reference speed unit and a third wheel driven by the reference speed unit and a third gear wheel in mesh with both said gear wheels, one member of said differential unit driven by its associated engine and the other member driven by said reference speed unit so that normal constant speed difference is maintained between the members, a flyweight governor driven by each differential unit, propellers driven by said engines, a pitch change motor for each propeller and connected to the respective flyweight governors whereby said governor controls its associated pitch change motor to maintain the associate engine in synchronism with the other engines, and means for adjusting datum speed of reference speed unit whereby speed of all engines is simultaneously varied and speeds are maintained in synchronism during variation.

6. In an airplane having a plurality of engine driven propellers in which the propeller blades are adjustable for pitch changes, and pitch change motors severally associated with said plurality of propellers, a speed control and synchronizing device for said engines comprising a reference speed unit common to all said engines, a differential unit associated with each engine, one member of said differential unit driven by its associated engine and the other member driven by the reference speed unit whereby normal constant speed difference is maintained between the members, a flyweight governor driven by each differential unit and connected with the pitch change motor of the associated propeller, said governor controlling pitch change motor to maintain associated engine in synchronism with other engines, and means for adjusting datum speed of reference speed unit whereby speed of all engines is simultaneously varied and speeds are maintained in synchronism during variation.

PETER RALPH PRICE.